May 9, 1967 W. M. HODDINOTT ETAL 3,318,098

WATERWAY DE-ICING APPARATUS

Filed Jan. 3, 1964

INVENTORS
WILLIAM M. HODDINOTT
DAVID C. HODDINOTT

BY Arthur A. March

ATTORNEY

United States Patent Office 3,318,098
Patented May 9, 1967

3,318,098
WATERWAY DE-ICING APPARATUS
William M. Hoddinott and David C. Hoddinott, both of 6 Rose St., Milford, Conn. 06460
Filed Jan. 3, 1964, Ser. No. 335,598
3 Claims. (Cl. 61—1)

This invention relates in general to an apparatus and method for de-icing water and more specifically for maintaining bodies of water and waterways free of ice.

Heretofore, it has long been desired to keep bodies of water open during cold spells for many reasons including, for example, the storage of boats. It has been known that fresh water has a maximum density, that is, its greatest weight at 39.2° F. which is 7.2° above freezing. Therefore, as the weather turns cold, this warmer and more dense water will stratify at the bottom of the body of water where it becomes stored to form a natural source of heat energy.

In salt water, a slightly different hydrodynamic principle is respected. That is, salt water, unlike fresh water, does not generally settle in thermocline layers or bands of varying temperatures. It has been noted that salt water tends to stratify according to the concentrate of salt in the water with the bottom layer always being more concentrated than the upper layer. Since the salinity lowers the freezing point of water to 28° F., the saltier, as well as the warmer water, forms a natural source of heat energy.

With the aforesaid knowledge, recent efforts have accomplished partially successful apparatus for de-icing water using the principle of heat transfer, i.e. by circulating the warm or denser water which tends to stratify at or near the bottom and urging the same toward the frigid surface. This circulation results in the melting of the surface ice or the prevention of formation of ice on the surface.

To accomplish the foregoing, two de-icing methods have heretofore been suggested. One method has been to use mechanical devices, for example, pumps to effect a circulation of the stratified warmer, dense water lying at the bottom of the water body. The other method involves controlled injections of air bubbles to raise the warmer and more dense water from the bottom of the water body to its surface by causing a change in the density and weight thereof.

In the use of the latter method, air was injected into a body of water by utilizing perforated hoses or lines strung along the bottom of the body of water with a land based compressor means sending compressed air through such hoses and the air ejected therefrom through the perforations formed in the hose. However, experience has shown that by laying such a hose or line along the bottom of the body of water that in a relatively short time the holes would tend to become clogged with the silt, dirt or sand to such an extent that a large percentage of the air was prevented from bubbling up through the body of water. When this occurs, the efficiency of the icing apparatus is greatly diminished. Also, it has been noted microbe organisms generally found in the water could easily gain a foothold about the apertures in the line and accumulate thereat to further aggravate the clogging of the apertures or air holes in the air line.

In addition, the air holes in the prior apparatus were located at the top of the hose, which arrangement made it practically impossible to remove the water which had infiltrated into the system when it was in idle condition. The air pockets formed between this water and the air holes prevented the escape of the water. Further, such water accumulation occurred as a result of condensation even when the system was operating in warm weather.

This trapped water restricted the size of the air passage along the top of the air hose, resulting in back pressure reducing the amount of air delivered throughout the entire system and requiring high pressures to remove the water. When frigid air was delivered to the system, the trapped water froze causing a part or all of the system to fail.

Therefore, it is an object of this invention to overcome the above noted disadvantages by providing a de-icing apparatus which is constructed and arranged so as to minimize the fouling of the bore or line with dirt, silt, sand or microbe organisms.

It is another object of the present invention to provide de-icing apparatus so arranged as to prevent the accumulation of undesirable water therein either through condensation when the system is operating or seepage when the system is idle, or for any other reason.

It is another object of this invention to provide an improved de-icing apparatus in which the hose is specifically constructed and arranged so that it may be maintained in a suspended position in the warmer and more dense stratum or layer of water.

It is a further object of this invention to provide the hose of a de-icing apparatus with apertures which are particularly constructed and arranged so as to minimize the clogging thereof with silt, sand, dirt and/or the closing thereof by the accumulations of the microbe organisms generally found in bodies of water.

The foregoing objects and other features and advantages are attained in accordance with this invention by providing a de-icing apparatus comprising essentially a length of plastic hose or the like which has formed therein a series of nozzle forming apertures spaced along the length thereof. Means are provided for maintaining the hose suspended within a body of liquid whereby it is disposed adjacent that stratum of water having maximum density. Essentially, the suspension means comprise cooperating buoys and counterweights secured along the length of the line. The cooperating buoys and weights are proportioned in a manner so that the hose is maintained in a suspended position within the body of water to be de-iced.

In accordance with this invention, it is preferred that the holes be formed along the bottom of the hose so that they direct an elastic fluid downwardly toward the bottom of the body of water. The location of the air holes is quite important in that any condensation or water seepage can be easily removed from the hose and, in fact, is the first fluid forced out when operating the system. This undesirable water accumulation can be removed even at relatively low pressures thus overcoming a substantial difficulty heretofore encountered with the prior apparatus. The apertures defining the nozzles are therefore constructed and arranged to prohibit the clogging thereof.

The respective apertures may be provided with a tapering or inclined wall surface, i.e. wherein the diameter of the respective aperture progressively decreases from the outer surface of the hose to the inner surface of the hose to define a venturi-like orifice. One end of the hose is then suitably connected to a means for injecting thereinto an elastic fluid, as for example, compressed air.

The arrangement is such that in operation the hose is suspended in a body of water off the bottom thereof and adjacent that stratum containing the warmer and more dense water. The passing of the elastic fluid through the hose and out through the specifically constructed aperture nozzles creates a hydrodynamic disturbance which causes the warmer and more dense water to rise toward the surface thereof. In this manner the upper surface of the water body is maintained at a temperature above freezing. Also, the heat of the elastic fluid added to that which is naturally stored by the water further enhances the heating of the upper surfaces of the water to effect de-icing thereof.

A feature of this invention resides in the specific construction of the aperture type nozzles spaced along the hose.

Another feature of this invention resides in the provision that the hose is constructed and arranged so as to be maintained suspended above the bottom of the water body and below the surface thereof.

Still another feature of this invention resides in the provision that the specific aperture construction inhibits the blocking or clogging of such apertures by particles or foreign matter contained in water.

Other features and advantages become more readily apparent when considered in view of the drawings and specifications in which.

Figure 1:
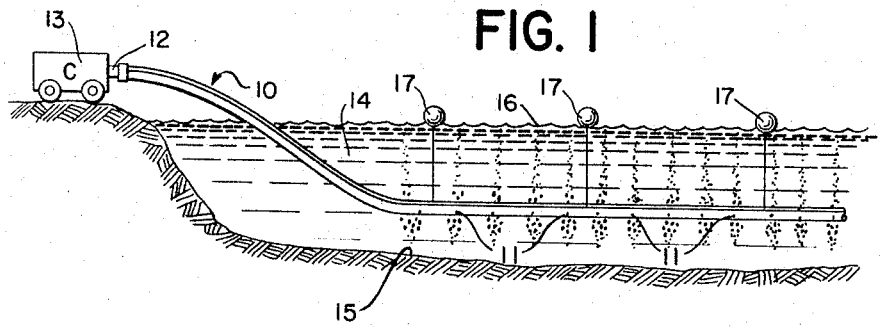
FIG. 1 illustrates the de-icing apparatus constructed in accordance with this invention as applied to a body of liquid.

Referring to FIG. 1, there is illustrated in accordance with this invention, the de-icing apparatus of this invention. As shown, it comprises essentially a length of plastic hose 10 or the like which has formed therein a series of perforations, holes, orifices 11 to define nozzles spaced along the length thereof. One end of the hose is fitted to connect to the outlet 12 of source of an elastic fluid, e.g. an air compressor 13 so that in operation compressed air is passed through the length of hose 10.

In accordance with this invention, means are provided for suspending the hose 10 within the body of water 14 so that it is maintained in a position above the bottom 15 of the body of water and below the surface 16 thereof. This is attained by securing to fins 10a provided in the upper part of the hose 10 suitable buoy devices 17 at spaced intervals. Also, the hose 10 is provided with suitable weights 18 to counterbalance the buoys. In the form shown, the weights comprise a lead pipe which is disposed at the bottom of the hose 10 and does not block the laterally offset air holes 11. The particular construction is arranged so that the buoys 17 and counterweights 18 are particularly proportioned so that the hose 10 is maintained suspended in the vicinity of that stratum of water which has the maximum density and the warmest temperature when used in fresh water. In salt water, the buoys and weights are specifically proportioned to maintain the hose 10 suspended adjacent that layer of water containing the highest concentration of salt.

Figure 2:
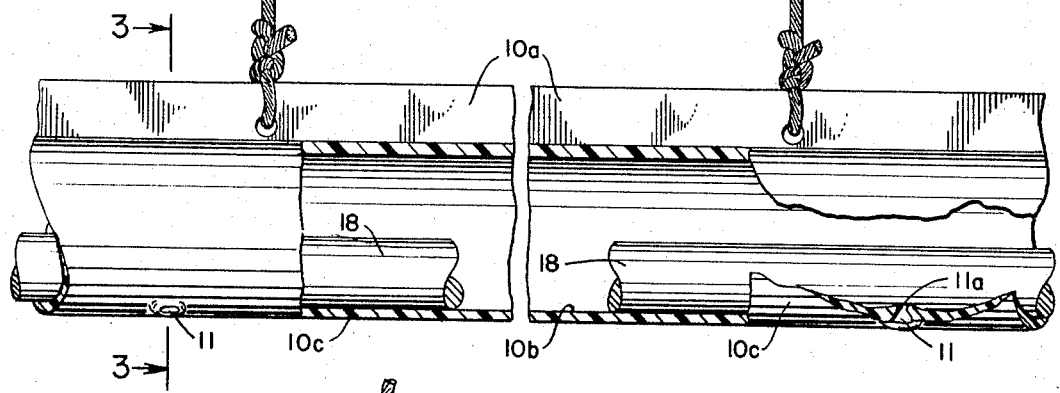
FIG. 2 is an enlarged detailed sectional view illustrating the hose construction in accordance with this invention.
Figure 3:
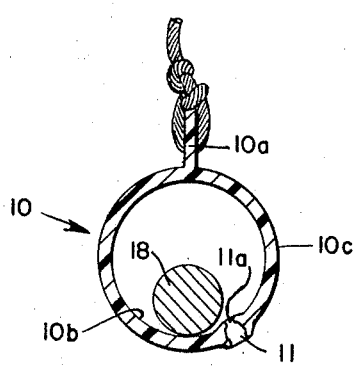
FIG. 3 is a sectional view taken on the line 3—3 of FIG. 2.

Further, in accordance with this invention, the apertures 11 formed in the hose are specifically constructed and arranged so as to prohibit the clogging thereof by either the silt, sand and dirt normally found in such bodies of water, or accumulations of microbe organisms suspended in water. This is attained by forming the apertures 11 in the hose 10 with a hot tapered, or conically shaped instrument, as for example, a hot needle or the like which converges toward its pivot. Thus, by utilizing a hot tapered needle for forming the apertures 11, the respective apertures are formed with an inclined wall surface 11a which converges toward the inner surface 10b of the hose 10. As is specifically seen in FIG. 2, the walls 11a defining the respective aperture or hole 11 have a diameter that progressively decreases from the outer surface 10c to the inner surface 10b of the hose. By forming the respective holes in a plastic hose with a hot needle, it was discovered that a very smooth glossy or glasslike surface is formed about the periphery walls 11a of the aperture. Because of the smoothness and glossiness of the surface 11a so formed adjacent the apertures, it has been observed that the microbe organisms normally found in such water have great difficulty in obtaining a foothold or foundation adjacent to such apertures so formed. As a result, the accumulations of microbe organisms and the clogging of the apertures 11 thereof is substantially eliminated. A further deterrent to clogging is due to the specific shape of the aperture or orifice 11 formed. As shown, the cross-sectional shape of the aperture 11 approaches that of a Venturi type orifice structure. As a result, the passage of the elastic fluid therethrough creates a velocity which will further inhibit the blocking or clogging of the apertures 11 by foreign particles floating in the water, as the force or pressure of the air being ejected will drive the particles outwardly from the hose. Thus clogging of the hose 10 under normal conditions is virtually eliminated as the velocity of the ejecting air will force the foreign particles outwardly before they can clog the smaller base openings of the aperture. Consequently, the conical cross-sectional shape of the aperture 11 functions to deter the accumulations of either dirt or microbe organisms in the small of the aperture. As a result, the apertures are maintained free of obstruction so that the hose is maintained at all times at its optimum efficiency.

The disposition of the holes at the bottom of the line facilitates the removal of undesirable waters which may accumulate through condensation collecting in warmer weather even when the line is operating and through seepage when the line is idle. By this construction, the system remains completely operative to properly function at all times.

In operation, the hose is laid out in that body of water 14 which is desired to be maintained ice-free. At one end of the hose 10 is connected a suitable source of fluid, e.g. compressed air. The operation of a compressor means 13 will force compressed air through the hose 10 where it is discharged therefrom through the respective openings or apertures 11. If desired, thermostatic means (not shown) in the form of a temperature bulb may be operatively associated with the compressor 13 so that the compressor 13 is energized only when the temperature of the atmosphere or the water falls below that of freezing. The bubbling of the compressed air through the warmer and more dense water at the bottom of the water body thus effects a hydrodynamic circulation of the warmer water from the bottom to the surface of the water body. In doing so, a heat exchange occurs whereby the heat of the warmer bottom water is transferred to the colder surface waters thereby raising the temperature thereof to above freezing.

While this invention has been shown and described with reference to a particular embodiment thereof, it will be understood that variations and modifications thereof may be made without departing from the spirit and scope thereof.

We claim:
1. A waterway de-icing apparatus comprising
 (a) a length of hose of plastic material adapted to be submerged in the body of said waterway,
 (b) means for suspending said hose in the stratum of said waterway having the greatest density,
 (c) said latter means including buoys connected along said hose, and cooperating counterbalancing elongated weight means disposed internally within said hose whereby said buoys and weight means are proportioned so that said hose is maintained suspended in said waterway,
 (d) said hose having a series of apertures adjacent the bottom of said hose and spaced to the side of said elongated weight means whereby said apertures are directed toward the bottom of said waterway,
 (e) and each of said apertures being defined by a smooth tapering wall surface that diverges toward the exterior surface of said hose whereby said aperture is rendered substantially conical in cross-section.

2. The invention as defined in claim 1 and including:
(a) means connected to said hose for passing an elastic fluid therethrough when submerged whereby said fluid discharging through said apertures creates a hydrodynamic disturbance causing the stratified warmer dense water to rise within the body of said waterway causing the surface thereof to warm to a temperature above freezing.

3. A waterway de-icing apparatus comprising
(a) a length of hose of plastic material adapted to be submerged in the body of said waterway, said hose having a fin member extending outwardly therefrom,
(b) means for suspending said hose in the body of said waterway,
(c) said latter means including buoys connected by an adjustable elongated member to said fin and co-operating counterbalancing elongated weight means disposed internally within said hose whereby said buoys and weight means are proportioned to suspend said hose above the bottom of said waterway and below the surface thereof,
(d) said hose having a series of nozzles spaced along the length thereof, and positioned away from said elongated weight means,
(e) each of said nozzles being defined by an aperture extending through the wall of said hose wherein the surface defining said hole progressively increases in cross-section from the inlet to outlet,
(f) and means connected to said hose for passing an elastic fluid therethrough when submerged whereby said fluid discharging through said nozzles create a hydrodynamic disturbance causing the stratified warmer more dense water to rise within the body of said waterway causing the surface thereof to warm to a temperature above freezing.

References Cited by the Examiner

UNITED STATES PATENTS

| | | | |
|---|---|---|---|
| 1,716,616 | 6/1929 | Brasher | 61—6 |
| 2,417,519 | 3/1947 | Persson et al. | 61—1 |
| 2,536,196 | 1/1951 | MacLeod | 61—13 |
| 2,991,622 | 7/1961 | Oster | 61—1 |
| 3,068,655 | 12/1962 | Murray et al. | 61—6 |
| 3,193,260 | 7/1965 | Lamb. | |

FOREIGN PATENTS 174,687    3/1961    Sweden.

EARL J. WITMER, *Primary Examiner.*